United States Patent [19]

Donaldson et al.

[11] Patent Number: 4,632,279
[45] Date of Patent: Dec. 30, 1986

[54] MANUALLY PORTABLE CONTAINER

[75] Inventors: Michael J. Donaldson, Ottawa; Leonard J. Charlebois, Kanata; Kevin J. Bailey, Nepean, all of Canada

[73] Assignee: Northern Telecom Limited, Montreal, Canada

[21] Appl. No.: 800,836

[22] Filed: Nov. 22, 1985

[30] Foreign Application Priority Data

Jun. 28, 1985 [CA] Canada ................................ 485913

[51] Int. Cl.$^4$ ..................... B67D 5/62; B65D 88/54; B32B 35/00; B29B 9/00
[52] U.S. Cl. ................. 222/146.5; 222/173; 222/334; 222/389; 222/409; 222/466; 425/13; 425/376 R; 425/542; 264/36; 220/327; 174/88 R; 292/251
[58] Field of Search ............... 222/146.5, 334, 389, 222/409, 466, 173; 425/13, 376 R, 542, 547, 87, 567; 141/231; 264/271.1, 272.11, 328.4, 328.5, 36, 1.5, 46.6, 46.9; 156/244.12, 500; 292/251, 256.5, 256.71, 256.73, 256.75; 70/159, 160; 220/324, 325, 327, 328; 138/31, 89, 90

[56] References Cited

U.S. PATENT DOCUMENTS

| 1,480,544 | 1/1924 | Cox ....................................... 220/324 |
|---|---|---|
| 3,093,865 | 6/1963 | Peters ............................... 425/567 X |
| 3,401,721 | 9/1968 | George ........................... 220/327 X |
| 3,666,134 | 5/1972 | Ranch ................................... 220/324 |
| 3,939,882 | 2/1976 | Gillemot .............................. 141/231 |
| 4,091,062 | 5/1978 | Nelson ................................. 264/36 X |
| 4,413,881 | 11/1983 | Kovats ........................... 264/271.1 X |
| 4,494,666 | 1/1985 | Cooper et al. .................... 220/327 X |
| 4,528,150 | 7/1985 | Charlebois et al. .......... 264/328.4 X |
| 4,549,040 | 10/1985 | Goetter ............................ 220/325 X |
| 4,555,295 | 11/1985 | Orikasa et al. ..................... 264/36 X |

FOREIGN PATENT DOCUMENTS

| 145393 | 5/1949 | Australia ................................. 425/87 |
|---|---|---|
| 1108102 | 5/1961 | Fed. Rep. of Germany ...... 222/389 |
| 2614280 | 10/1977 | Fed. Rep. of Germany ........ 425/87 |
| 1102894 | 10/1955 | France ................................. 220/327 |
| 1435053 | 5/1976 | United Kingdom ................ 222/389 |
| 597797 | 3/1978 | U.S.S.R. ............................... 222/334 |
| 417255 | 2/1980 | U.S.S.R. ............................... 222/389 |

Primary Examiner—Joseph J. Rolla
Assistant Examiner—Gregory L. Huson
Attorney, Agent, or Firm—R. J. Austin

[57] ABSTRACT

A heat insulated manually portable container for dispensing molten plastics material and having a movable piston within a cylinder, a heater for plastics material and a closure equipped with a locking means. The locking means is exteriorly positioned of the reservoir and comprises pairs of complementary screw-threaded members which are engageable through aligned slots in the closure and a body defining the cylinder. The members of each pair are movable along the slots to a quick release position which allows for withdrawal of the members through the closure slots upon opening of the closure.

5 Claims, 5 Drawing Figures

MANUALLY PORTABLE CONTAINER

This invention relates to manually portable containers for dispensing molten plastic material.

In some industries, it is necessary for operators working in the field to seal articles, for instance, against the effects of ambient conditions. Various methods of sealing have been suggested and one which has recently been proposed and has been successfully used is the method of sealing by providing a mold which surrounds the article and an encapsulation is formed around the article by transferring heated molten plastics material into the mold cavity and allowing it to cool and set. Encapsulations formed by molding techniques have successfully been employed in the telecommunications cable industry. In the telecommunications cable industry, it is necessary to form splices in the field and this involves cutting into a cable to enable the conductors to be reached. The conductors are then severed and connected to other wires leading from the cable. It is then necessary to seal around the area of the splice to prevent the connections between the conductors from being adversely affected by atmospheric conditions such as dampness or affected by moisture conditions such as is found surrounding underground cables. The use of polymeric materials, as molded encapsulations around such splices, has simplified previous encapsulation procedures and also has cheapened the encapsulation process.

Successful methods of sealing, including molded encapsulations, have been described in U.S. Pat. Nos. 4,152,539, granted May 1, 1979 and 4,322,573, granted Mar. 13, 1982, both patents being in the name of Leonard J. Charlebois.

It has been found that preformed encapsulations around preformed splices may be easily provided upon cable before leaving the factory, by the use of factory installed extruders which can form an encapsulation in less than 3 minutes. Difficulties have been discovered, however, in the provision of encapsulations in the field. In the field, no ready machinery has been available for the forming of encapsulations and it has been impractical to consider using factory equipment in the field. The manufacture of encapsulated or sealed splices in the field by modern techniques must require the use of small manually portable units of apparatus for providing molten flowable plastics material and for forcing such material into mold cavities. Problems have been associated with the smallest equipment available and which is capable of being carried by an operator, in that such equipment has been extremely slow to operate and would add unduly to the cost of the operation, in addition to the unnecessary time consumption. These particular units are small extruders and only deliver around 11 lbs of molten flowable material per hour. This means that for each encapsulation, about 20 minutes is required to fill the mold. Apart from the unnecessary amount of time involved, the time period makes the process impractical because the plastics material, which is initially forced into the cavity, commences to harden while further material is being forced in. This causes layering of the hardened material and an inferior encapsulation results, which can lead to cracking. In addition, these small extruders are driven electrically and it is extremely difficult to have electrical power cables extending from the power source to the extruders in situations where the encapsulations are to be located underground and are therefore to be formed in holes dug to reach the buried cables. Furthermore, the presence of dampness in the holes makes the use of high current power dangerous.

These problems are discussed in a copending U.S. patent application Ser. No. 527,759, filed Aug. 30, 1983, now U.S. Pat. No. 4,528,150 and corresponding Canadian Application No. 435,860, filed Sept. 1, 1983, entitled "Methods and Apparatus for Sealing Articles", in the names of Leonard J. Charlebois, Renato Mariani and Fred A. Huszarik.

The above problems, together with a further problem concerning the operational pressure of the existing equipment, are overcome by the invention claimed and described in those applications. As described in the above applications, plastics material is heated to a molten state by being extruded from extruders while being forced through the inlet of a reservoir defined within a manually portable accumulator. The material is maintained at a molten flowable temperature while held within the reservoir and the reservoir is then disposed in communication with a mold cavity, partly defined by the article to be sealed. The molten material is then forced from the reservoir into the mold cavity at a sufficiently fast rate to fill the cavity before flow passages into the cavity become blocked with hardening material. Thus, using the extruder in combination with the accumulators enables the extruders to be located in a fixed position, possibly in a workshop or in a vehicle, and the accumulators may be carried by hand to the site at which a splice is to be provided. It follows that the molten material may be held in its molten condition for lengthy periods before being required to perform an encapsulating operation. When required, it is simply necessary to transport the accumulator manually to the site and then force the molten material from the accumulator into the mold cavity. Thus, the use of extruders in the actual molding operation is avoided.

In U.S. patent application Ser. No. 668,601, filed Nov. 5, 1984 (Canadian Application No. 466,886, filed Nov. 1, 1984) and entitled "Encapsulating Articles" in the name of L. J. Charlebois, there is described a method of encapsulating an article in which there is a reduction in the number of extruders required. In the invention described in the latter application, the method concerns the placing of sufficient non-molten plastic material into a cylindrical reservoir and heating it to render it molten and homogeneous, thereby avoiding the step of placing the material in already molten form into the reservoir. In that application the container has a removable end plate which exposes the one end of the reservoir upon removal to enable the non-molten plastics material to be inserted into the reservoir.

The present invention provides a manually portable container for dispensing molten plastics material and having a reservoir which may be readily and quickly opened for admittance of non-molten plastics material and then closed for use of the plastics material in molten form.

Accordingly, the present invention provides a manually portable container for dispensing molten plastics material, the container having an outlet end with an outlet nozzle at the outlet end and further comprising a body defining a cylinder; a piston within the cylinder to define a cylindrical reservoir for plastics material extending from one side of the piston to the outlet end of the container; means to move the piston along the cylinder alternatively for increasing and decreasing the capacity of the reservoir; heating means for heating plastics material within the reservoir; heat insulating means around the cylinder; a closure for the reservoir, the closure movable into and out of a reservoir closed position; and locking means to hold the closure in the closed position and comprising first and second complementary screw-threaded members, the first screw-threaded members spaced-apart around and exteriorly of the reservoir, each first member engageable with a second screw-threaded member through aligned slots in the body and closure with the closure in the closed position and with the first members slidably held within guides provided upon the body to allow movement of the engaged members along the slots, the closure slots having narrow and wide sections with the engaged members holding the closure in the closed position when located through the narrow slot sections and permitting closure movement out of the closed position when the engaged members are in the wide slot sections by withdrawal of the second members through the closure slots.

With the above container according to the invention, the locking means in being exteriorly of the reservoir do not interfere with the passage of the non-molten material into the reservoir and there is no danger of the locking means being contacted by the molten plastics material. In a preferred arrangement the closure is connected to the body by a hinge. Thus, it is a simple matter to move the screw-threaded members along the slots into the wide slot sections to enable the closure to be opened and closed upon its hinge.

It is a prime consideration that the container should be heat insulated as efficiently as possible to retain the maximum amount of heat within the reservoir for heating purposes and to maintain any plastic therein in a molten condition. With this in mind it is essential to surround heat transfer materials from the reservoir with heat insulating material. In view of this, and in a preferred arrangement, insulating means which extends along the cylinder to surround the reservoir also covers the first screw-threaded members and guides as they extend from the slots in the body. In addition, the cover is provided with insulating means and to resist the degree of heat transfer from the reservoir through the screw-threaded members, the second screw-threaded members are located within clearance holes within the closure insulating means and are sunk below the surface of this insulating means.

One embodiment of the invention will now be described by way of example, with reference to the accompanying drawings, in which.

Figure 1:
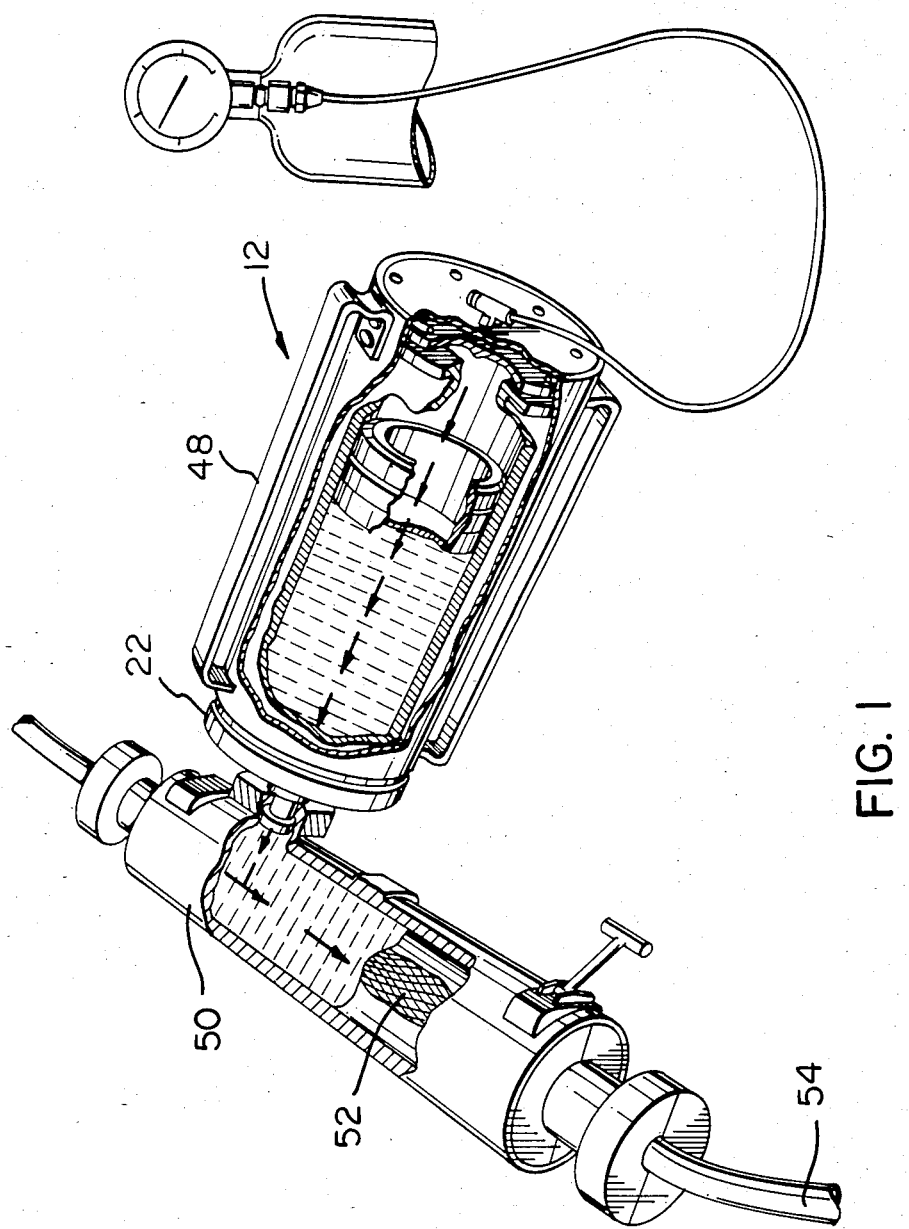
FIG. 1 is an isometric view, partly in cross-section, showing a container of the embodiment attached to a mold and showing molten plastic material being injected into the mold cavity.
Figures 2, 3, 4, 5:
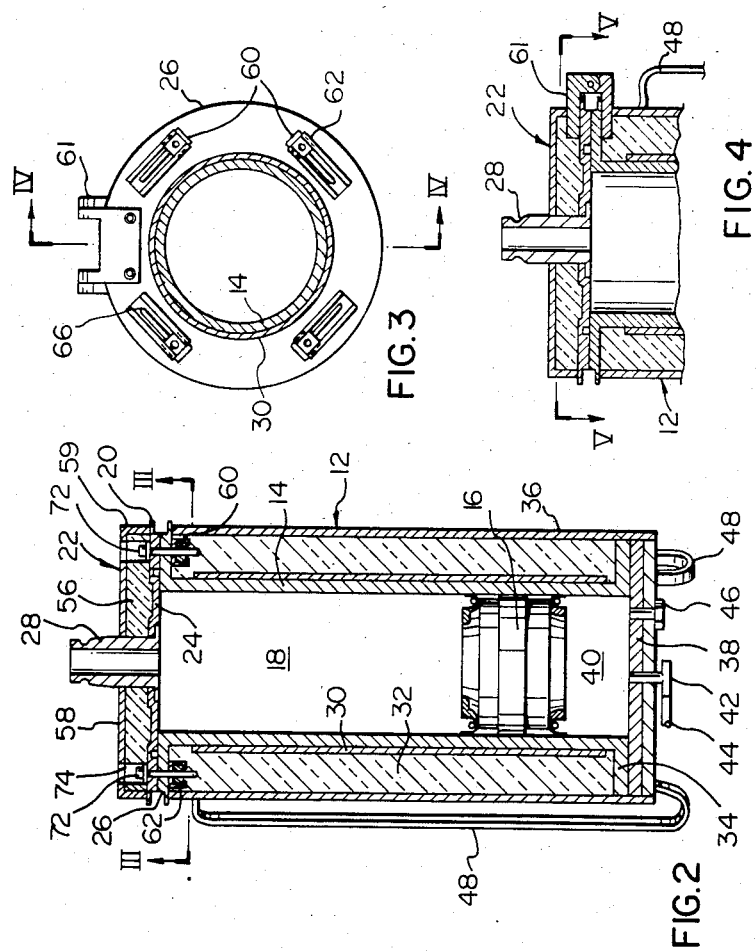
FIG. 2 is a cross-sectional view through the container shown in FIG. 1.
FIG. 3 is a cross-sectional view taken along line III—III in FIG. 2 with insulating material omitted to show other parts more clearly.
FIG. 4 is a cross-sectional view through the container taken along line IV—IV in FIG. 3.
FIG. 5 is a cross-sectional view of the container taken along line V—V in FIG. 4 and with insulating material omitted to show other parts more clearly.

As shown in FIGS. 1 and 2, a manually portable container 10 briefly comprises a body 12 which is provided with a cylinder 14 containing a piston 16 which is slidable along the cylinder for increasing and decreasing the capacity of a reservoir 18 lying between the piston and an outlet end 20 of the container. A closure 22 of the container comprises a closure plate 24 which, in a reservoir closed position as shown in the Figures, seals against an outwardly extending annular flange 26 of the body at the outlet end. An outlet nozzle 28 is secured concentrically to the plate 24.

Surrounding the cylinder 14 is an electrical heating element 30 which encircles the cylinder and a heat insulating means 32 which encircles the heating element and is in the form of glass wool insulation or other insulating material. This insulation extends completely along the cylinder to contact the flange 26 at the outlet end and also a flange 34 of the cylinder at the other end as shown by FIG. 2. Surrounding the insulation is a protective metal cylindrical cover 36 which abuts the flange 26 at one end and overlaps the flange 34 at the other end. An end wall 38 extends across the flange 34 to close the cylinder at that end. A chamber 40, defined between the piston and the end wall 38, is gas pressurizable through a gas pressure inlet 42 which is fed with pressurized gas through a flexible tube 44. The end plate also carries a pressure relief valve 46.

A support means is provided for the container to enable the container to be disposed with the outlet end of the chamber to be located above the reservoir as shown by FIG. 2. This support means comprises a plurality, namely three in this embodiment, of carrying handles 48 which are secured to the two ends of the body in substantially equally spaced-apart positions around it. Each handle extends axially of the container and the end of each handle extends beyond the end plate 38.

The manually portable container 10 is intended to be used for forming a plastics insulation around a splice formed in a telecommunications cable. Its method of use is as described in copending U.S. patent application Ser. No. 668,601 filed Nov. 5, 1984 (Canadian Application No. 466,886 filed Nov. 1, 1984), entitled "Encapsulating Articles" and in the name of L. J. Charlebois. In use, the container is located in the position shown in FIG. 2 with the supports or handles 48 holding the container vertically on the ground. With the closure 22 removed from the closed position of the reservoir shown in FIG. 2, non-molten plastics material which may be in the form of a preformed billet, is placed into the reservoir with the piston towards the lower end of the body as shown by FIG. 2. The closure 22 is then replaced and is tightly secured to the body by a locking means to be described. A heating operation is then performed by heating the plastics material with the heater 30 to render it molten without causing degradation of the molten material. In this particular case, the plastics material is a low density polyethylene sold under the Dupont Trade No. 2114 and contains 2000 parts/million of "Irganox 1010", which is a heat stabilizer and antioxidant. Other antioxidants and/or heat stabilizers may be used, such as "Sanitox R", a trade name of Monsanto Corporation.

After the plastic billet has become molten, then it is necessary to ensure that all the entrapped air has escaped from the molten material. To do this, the container remains in the vertical Position shown in FIG. 2 so that any gases are allowed to move upwardly through the molten mass and out from the top surface of the plastic. As it is expected that little or no air is entrapped within the billet, then the only air which may require to escape is that which lay between the billet and the cylinder wall before the heating operation took place. During the heating process, the plastic billet expands and accommodates the extra space, thereby assisting in expelling air.

When sufficient time has elapsed to allow for the escape of the gases and with the closure 22 in position, the piston is moved towards the end plate 24 by fluid under pressure through the flexible pipe 44 so as to completely fill the reservoir with the plastics material by expulsion of the air or gasses at the upper end. When the plastics material begins to flow through the nozzle 28, thereby guaranteeing that no air exists within the reservoir, the container is secured to the inlet of a mold 50 (see FIG. 1). This mold is a low pressure mold and may be of the construction described in U.S. Pat. Nos. 4,152,539 and 4,322,573. Within the mold, a spliced region 52 of a cable 54 is located, the cable extending from both ends of the mold. The mold is disposed in a normal setting for an in situ molding operation, that is at the bottom of a pit in the ground for encapsulating and sealing splices formed in an underground cable.

The molding operation is then performed by moving the piston 16 towards the closure 22 so as to dispel sufficient of the molten material through the nozzle 28 and into the mold cavity so as to completely fill the cavity and encapsulate the splices formed between conductors at the splice region 52. The formation of encapsulations within a mold in this manner has been described previously in patents in the name of L. J. Charlebois and include the two U.S. patents referred to above.

In this embodiment, it is intended that there should be a high efficiency in heat retention within the reservoir while making the closure movable easily and quickly into and out of its reservoir closed position with the use of a locking means which does not add unduly to the heat transfer properties of the container. With this object in mind, the closure 22 is itself insulated with a layer of insulation 56 of similar material to the insulation 32. This insulation 56 covers the plate 24 and is itself protected by a protective metal sheet 58 which has a planar surface closely surrounding the nozzle 28 and a peripheral flange 59 which extends around the sides of the insulation.

For ease of movement of the closure upon the body of the container, the closure is hinged by a hinge 61 as shown in FIGS. 4 and 5. This hinge is secured firmly to the flange 26 of the body and also to a peripheral region of the plate 24. To resist heat transfer, a layer of polytetrafluorethylene is sandwiched between the hinge plates and the plate 24 and the flange 26 of the container. Also, as shown in FIG. 4, the flange plates are embedded as far as possible into the insulation of the cover and the body.

The locking means is located exteriorly of the reservoir so as to not be affected by molten plastics material or to restrict the opening for admission of a plastics billet. As shown by FIGS. 2, 3 and 5, the locking means comprises a plurality, namely four, nuts 60 which are slidably held within guides 62 mounted on the flange 26 of the body and facing towards the other end. Because of this arrangement, both the nuts and the guides are embedded within the insulation 32 so as not to be in connection with ambient atmosphere for heat transference from the reservoir. As can be seen from FIGS. 3 and 5 particularly, the closure plate 24 and the flange 26 are formed with slots 64 and 66 respectively and these slots are aligned with each other when the closure is in the closed position shown in FIG. 2. The slots 64 have narrow sections 68 and wide sections 70. The locking means also comprises bolts 72 (FIGS. 2 and 5) and these bolts pass through the slots to engage the nuts 60. As can be seen, the bolts and the nuts when engaged together are movable as an assembly along the slots between the narrow and wide sections. When the heads of the bolts are in alignment with the wide sections 70 of slots 64, then they may pass through these sections thereby enabling the closure to be hinged into and out of its closed position. However, when the engaged members pass through the narrow sections of the slots 64, the heads of the bolts abut against a surface of the plate 24 at either side of each of the slots (as shown by FIG. 5) thereby holding the closure in its closed position. As can be seen from FIG. 2, the bolts are submerged below the surface of the insulation within clearance holes 74 in the closure. Thus the heads of the bolts do not protrude outwardly of the container for heat transference.

As can be seen from the above arrangement of the locking means, the locking means itself does not add unduly to the heat transfer characteristics of the container and so far as is practicable the locking means is housed within the insulating means of the complete arrangement. Thus, a high degree of heat retention is provided for the container to enable the plastics material to be rendered molten and maintained in a molten condition as efficiently as possible. This heat efficiency is provided while also enabling the container to be opened and closed as readily and quickly as possible.

What is claimed is:

1. A manually portable container for dispensing molten plastics material, the container having an outlet end with an outlet nozzle at the outlet end and further comprising:
    a body defining a cylinder;
    a piston within the cylinder to define a cylindrical reservoir for a plastics material extending from one side of the piston to the outlet end of the container;
    means to move the piston along the cylinder alternatively for increasing and decreasing the capacity of the reservoir;
    heating means for heating plastics material within the reservoir;
    heat insulating means around the cylinder;
    a closure for the reservoir, the closure movable into and out of a reservoir closed position; and
    locking means to hold the closure in the closed position and comprising a plurality first and second complementary screw-threaded members, the first members spaced-apart around and exteriorly of the reservoir, each first member engageable with a second member through aligned slots in the body and closure with the closure in the closed position and with the first members slidably held within guides provided upon the body to allow movement of the engaged members along the slots, the closure slots having narrow and wide sections with the engaged members holding the closure in the closed position when located through the narrow slot sections and permitting closure movement out of the closed position when the engaged members are in the wide slot sections by movement of the closure away from the second members.

2. A container according to claim 1, wherein the closure is movably connected to the body by a hinge.

3. A container according to claim 1, wherein the body has an outwardly extending flange at its outlet end, the flange defining the slots in the body and the insulating means extending along the cylinder to cover the first screw-threaded members and guides which are carried upon the flange.

4. A container according to claim 3, wherein the closure comprises a plate formed with the slots in the closure and insulating means is provided on a surface of the plate to be exteriorly of the container with the closure in the closed position, the second members extending through the slots and lying within clearance holes in the closure insulating means.

5. A container according to claim 4, wherein the second members lie beneath an outer surface of the closure insulating means.

* * * * *